United States Patent [19]

Mayer

[11] 4,256,533
[45] Mar. 17, 1981

[54] METHOD OF CONSTRUCTING LAYERED GLASS DISPLAY PANELS

[75] Inventor: William N. Mayer, White Bear Lake, Minn.

[73] Assignee: Modern Controls, Inc., Elk River, Minn.

[21] Appl. No.: 112,103

[22] Filed: Jan. 14, 1980

[51] Int. Cl.³ .................. B44C 1/22; C03C 15/00; C03C 25/06
[52] U.S. Cl. ................................ 156/633; 156/89; 156/101; 156/659.1
[58] Field of Search ............... 156/629, 630, 633, 652, 156/653, 655, 657, 659.1, 663, 667, 145, 89, 101, 102; 29/25.1–25.16; 313/220, 221; 315/169.4; 316/1, 17; 430/313, 314, 316, 317, 321, 323, 325, 328, 329

[56] References Cited

U.S. PATENT DOCUMENTS

| 3,704,052 | 11/1972 | Coleman | 156/633 X |
| 3,789,470 | 2/1974 | Owaki et al. | 156/629 X |
| 4,160,311 | 7/1979 | Ronde et al. | 29/25.14 X |

Primary Examiner—William A. Powell
Attorney, Agent, or Firm—Paul L. Sjoquist

[57] ABSTRACT

Method is disclosed for applying sealing glass to glass surfaces intermediate multiple layers, etching channels through the sealing glass and partially into a glass layer, and bonding to the glass layers together to form a unitary glass display panel.

11 Claims, 5 Drawing Figures

METHOD OF CONSTRUCTING LAYERED GLASS DISPLAY PANELS

BACKGROUND OF THE INVENTION

This invention relates to a method for constructing a glass panel of the type utilized in gaseous display technology, commonly called a "plasma" panel. Typical of such panels is a construction requiring multiple layers of glass to be bonded together, the respective layers containing conductor segments deposited thereon and/or predetermined voids or channels therein for enclosing a gaseous mixture. When constructed, such panels may be electrically energized via the conductor segments so as to create gaseous ignition in the voids between selected conductor segments and thereby produce a visual display which may be observed. Patterns of such gaseous ignitions are typically combined to form alphanumeric characters which are observable through the glass panel and are arranged along lines and/or columns to provide a meaningful alphanumeric display for communication purposes. Such displays may be energized and controlled by digital computers or other digital equipment and thereby provide a useful output device for such computers and other digital equipment. When coupled to and driven by an alphanumeric keyboard such displays provide a direct readout of the characters selected by depressing keys on the keyboard, and in combination therewith, serve as a useful input device for computers and other digital equipment.

Gas display panels have been utilized for the foregoing purposes, and have had various constructions. For example, U.S. Pat. Nos. 3,964,050, issued June 15, 1976, 3,860,846, issued Jan. 4, 1975, and 4,480,597, issued Mar. 21, 1978, disclose a number of constructional variations for such panels. Common to most of these gas display panels is the need to provide multiple glass layers which are selectively etched with voids and overlaid with conductor patterns along their respective facing surfaces and subsequently bonded together to form a unitary glass structure. A gas mixture is introduced into the voids created by the etching process, and the panel conductor segments are externally wired to voltage excitation devices for providing the voltage energization necessary to cause selective gaseous ignition. The manufacturing process for such panels is extremely precise and painstaking, for each manufacturing step involves a number of precision operations, and the construction of a typical display panel requires the cumulative successful execution of a considerable plurality of such manufacturing steps, any one of which if unsuccessfully completed results in an inoperative and useless display panel. Consequently great attention is directed to simplifying and improving the reliability of the various manufacturing steps so as to reduce the overall panel rejection rate which occurs during the manufacturing process. Since all of the manufacturing steps are cumulative, any improvement in reliability of a single step greatly enhances the chances of successfully producing a workable panel.

Construction of glass display panels of the type for which the present invention is best suited are panels having a plurality of gas channels etched into the glass layers for containing a gaseous mixture. It is typical that a plurality of such channels are etched along the surface of one glass section and a plurality of conductor segments are deposited along the surface of a facing glass section, and the etched channels and conductor segments are respectively orthogonally positioned relative to one another and the glass layers are subsequently bonded together to form a unitary whole which ultimately comprises the display panel. The techniques of bonding respective glass layers together have involved the utilization of a sealing glass which is initially applied as a paste along the edge surfaces of the facing glass sections, the glass sections then being carefully positioned in facing relationship and compressed together, and the assembly fired in an oven at a suitable elevated temperature such that the sealing glass melts into and becomes a bonded part of the glass sections. It is typical that this bonding process is accomplished prior to the introduction of a gaseous mixture into the internal voids of the display panel, and a means for introducing such gaseous mixture is typically provided. Once the gaseous mixture has been introduced into the voids in the panel the means for accomplishing such introduction is sealed to provide a completely enclosed panel having internal voids uniformly containing a gas mixture of the type selected for optimum display. The conductor segments are brought to the panel edges whereby external electrical conductors may be attached for applying the excitation voltages needed for controlling the display panel.

SUMMARY OF THE INVENTION

The present invention represents an improvement in the method of constructing the multiple glass layers for display panels. A sealing glass layer in paste form is uniformly applied across the entire surface of one of the glass sections, and the sealing glass is melted into the surface, and selected portions of the sealing glass are etched away through an etching process as a preliminary step to the further etching of channels in the glass surface. Next, the channels themselves are etched through a further etching process, and the glass plate sections are then aligned, compressed, and fired in a furnace to form a unitary panel, wherein sealing glass bonds the interface junction at all points where voids have not been etched in the glass plate sections.

It is therefore a principal object of the invention to provide a method of constructing glass display panels having a uniform bond over the entire surface area where glass surfaces are in contact.

It is another object to provide a method of constructing glass display panels utilizing a simpler and reduced number of process steps to improve the yield rate of the manufacturing process.

It is a further object of the present invention to provide a method of constructing glass display panels having uniform dimensional tolerances so as to improve the reliability of operation of the panel.

BRIEF DESCRIPTION OF THE DRAWINGS

A description of the preferred embodiment of the invention is provided hereinafter, and with reference to the appended drawings, in which.

DESCRIPTION OF THE PREFERRED EMBODIMENT

Figure 1:
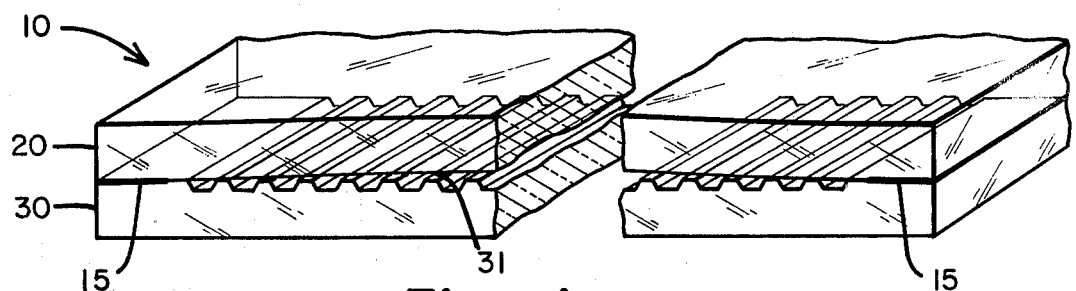
FIG. 1 illustrates a prior art panel construction.

Referring first to FIG. 1, a partial isometric view is shown of a glass display panel constructed according to prior art techniques. Display panel 10 is formed primarily from a glass plate section 20 and a glass plate section 30 which are bonded together according to known prior art techniques. A thin layer of sealing glass 15 is applied along the edges of the facing plate surfaces, and the two plate sections 20 and 30 are then compressed together and fired in an oven at temperatures which cause the sealing glass to melt and adhere to both sections, thereby forming a unitary bond. The bonded glass sections are then removed from the oven and cooled, and further constructional steps are applied to create a finished panel.

Before being bonded together, the facing surfaces of the glass plates are respectively etched and deposited with a plurality of conductor segments, as for example on the facing surface of plate section 20, and etched with longitudinal voids or channels as for example on the facing surface of plate section 30. The conductor segments and channels are orthogonally positioned relative to one another prior to bonding the plate sections together and it is desirable that the conductor segments maintain a uniform positional displacement relative to the channels over the entire surface of the finished panel. FIG. 1 illustrates a warpage problem in exaggerated view, which frequently occurs during the heating and cooling process when constructing such panels. A slight warpage of either glass panel section causes a portion of its facing surface to lift away from the other panel section, as shown at 31, thereby increasing the separation of the conductor segments of panel section 20 along the warped portion 31 from the corresponding gas channels in section 30. Further, this warpage problem permits gaseous mixture and ions to escape from one gas channel into adjacent channels which contributes to unreliability in the operation of the panel. Since the principle of operation of such gas display panels depends upon the controlled generation of gas ions in establishing gaseous ignition, the free travel of such ions into adjacent gas channels creates spontaneous ignition in regions of the panel where it is undesired. The visual effect which an operator observes from this problem is seen as a distortion of the alphanumeric display being presented, either by portions of alphanumeric characters being extinguished or by spurious and/or illegible alphanumeric characters being presented. This warpage problem, if severe, will prevent operation of the panel and, even if minor, will result in a panel having poor quality image registration and clarity. The overall effect of the warpage problem is to cause a high rejection rate in panels that undergo quality testing at the end of the manufacturing process, which significantly increases the overall costs of manufacturing such panels in quantity.

Figure 2:
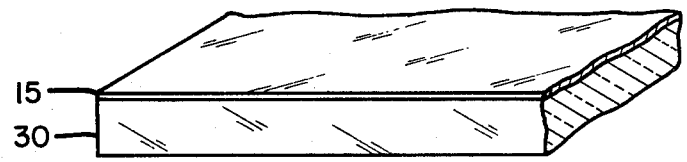
FIG. 2 illustrates a partial isometric view of a glass panel section.

FIGS. 1-5 illustrate several steps of operation of the method of the present invention. For ease of comparison with FIG. 2, similar reference numbers are utilized to describe similar components of the glass display panel. FIG. 2 shows, in partial isometric view, a glass section 30 prior to any etching operations. A thin sealing glass layer 15 is applied over the top surface of glass plate section 30, typically in a paste form which may be easily handled. This glass sealing layer may be of a type manufactured by Electro Science Laboratories, Pennsauken, N.J., as Type 4022-C. The thickness of this sealing glass layer is typically 0.2-0.5 mils (0.0002-0.0005 inch) in a uniform layer. Glass section 30 is then fired in an oven at a temperature sufficient to melt the sealing glass layer and cause it to bond to glass section 30, but at a temperature insufficient to melt glass section 30. Suitable temperatures for this purpose range between 450° C. and 490° C. After heating and melting the sealing glass layer to bond it to the top surface of glass plate section 30 the sealing glass thickness should uniformly be in the range of 0.2-0.5 mils.

Figure 3:
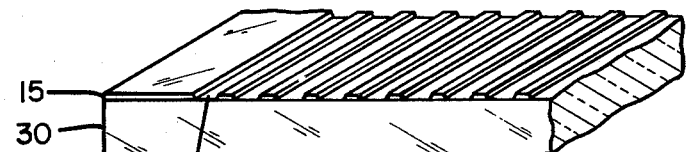
FIG. 3 illustrates the section of FIG. 2 after a further manufacturing step.

FIG. 3 illustrates a subsequent step in the process of manufacturing according to the teachings of the present invention. A photoresist pattern is applied to the top surface of the sealing glass layer 15. This pattern is a photographic image of the voids or gas channels which are subsequently to be constructed into the glass section 30. Typically these gas channels are 10 mils wide and at a spacing of 5 mils between adjacent channels. The sealing glass layer is then etched in a proper etching bath, such as a composition including hydrochloric acid, to remove the sealing glass thin layer at the respective gas channel positions. The etching process stops when the sealing glass layer has been removed at all points where a gas channel is to be formed. This produces a plurality of channels 32a having a very shallow depth corresponding to the thickness of the sealing glass applied in the previous steps.

Figure 4:
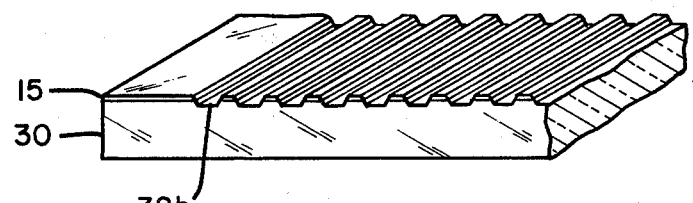
FIG. 4 illustrates a section of FIG. 3 after a further manufacturing step.

FIG. 4 illustrates the next subsequent process steps wherein a further etching process is applied utilizing an etching composition including materials such as hydrofloric acid, which causes etching into glass section 30 to an appropriate depth. In a typical panel the etching is allowed to proceed to a nominal depth of about 2 mils, resulting in a plurality of channels 32b across the surface of glass section 30.

A subsequent series of process steps, not directly pertinent to the present invention, are utilized to deposit conductor line segments on the facing surface of glass plate section 20, and these conductor line segments are preferably subsequently overlaid with another thin layer of glass.

Figure 5:
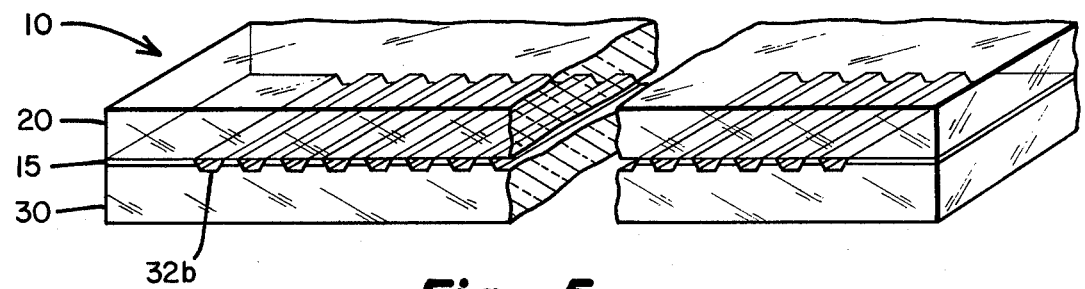
FIG. 5 illustrates a partial isometric view of two glass panel sections in final construction form.

FIG. 5 shows the process steps after the foregoing steps are completed and which result in the construction of a final bonded glass display panel 10. Glass section 20 is positioned atop glass section 30, the respective facing surfaces having conductor segments, (not shown) and channels 32b in orthogonal relationship. Sealing glass layer 15 appears at all points on the top surface of glass section 30 where channels 32b have not been etched away. Glass sections 20 and 30 are compressed together and fired in an oven at a temperature sufficient to cause sealing glass layer 15 to again melt and bond itself to both facing surfaces of sections 20 and 30. Since sealing glass layer 15 is distributed over the entire facing surfaces the glass bond achieved through this process step is a uniform surface bond between both glass sections. Display panel 10 is then removed from the oven and cooled and subsequent manufacturing steps are applied to construct a finished panel. The uniformity of the glass bond ensures that uniform conductor spacing exists with respect to all gas channels even if some glass warpage occurs during the cooling process. In this event the entire display panel 10 will undergo a slight warp, but no separation will occur between the facing surfaces of sections 20 and 30, and dimensional tolerances are thereby maintained. The net result is a glass display panel having increased reliability and superior quality.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A method of constructing a gas display panel with glass plate sections, comprising the steps of:
    (a) overlaying a first surface of a first glass plate section with a uniform layer of sealing glass;
    (b) applying a photoresist pattern to said sealing glass layer;
    (c) etching through selected portions of said sealing glass as determined by said photoresist pattern in a first etching bath;
    (d) etching into said first surface of said first glass plate section a predetermined depth as determined by said photoresist pattern in a second etching bath; and
    (e) compressing said first surface of said first glass plate against a surface of a second glass plate and firing same in an oven at temperature sufficiently high to melt said sealing glass layer.

2. The method of claim 1, wherein said uniform layer of said sealing glass is between 0.0002 and 0.0005 inches in thickness.

3. The method of claim 1, wherein said predetermined depth of etching into said first surface of said first glass plate section is approximately 0.002 inches.

4. The method of claim 1, wherein said first etching bath comprises a bath including hydrochloric acid.

5. The method of claim 1, wherein said second etching bath comprises a bath including hydrofloric acid.

6. The method of claim 1, wherein said step of overlaying the first surface of a first glate plate section further comprises applying a uniform paste layer of a sealing glass composition to said first surface; heating said paste to a temperature sufficient to melt said paste into a uniform layer of sealing glass bonded to said first surface; and cooling said sealing glass layer.

7. The method of claim 6, wherein said sealing glass layer is of thickness in the range of 0.0002-0.005 inches.

8. A method of constructing a flat glass display panel by bonding together glass plate sections, comprising the steps of:
    (a) applying a thin, uniform layer of sealing glass over a surface of a first glass plate section;
    (b) affixing a photographic image of photoresist material over said sealing glass layer, said image corresponding to said display panel functional characteristics;
    (c) immersing said first glass plate section in an etching bath of the type for etching sealing glass and then removing said first plate section from said etching bath;
    (d) immersing said first glass plate section in an etching bath of the type for etching said first glass plate section, for a predetermined time, and then removing said first plate section from said etching bath;
    (e) compressing said first glass plate section against a second glass plate section with said sealing glass intermediate said two sections;
    (f) firing said compressed two sections at a temperature sufficiently high to melt said sealing glass, but not sufficiently high to melt said two glass plate sections; and
    (g) cooling said two sections and said intermediate sealing glass layer, whereby a unitary display panel is formed.

9. The method of claim 8, wherein said predetermined time for etching said first glass plate section is sufficient to cause etching to a depth of approximately 0.002 inch.

10. The method of claim 9, wherein said uniform sealing glass layer is between 0.0002 and 0.0005 inches in thickness.

11. The method of claim 10, wherein said etching bath further comprises a mixture including hydrochloric acid for etching said sealing glass, and a mixture including hydrofloric acid for etching said first glass plate section.

* * * * *